United States Patent
De Bruin et al.

(10) Patent No.: US 12,371,013 B2
(45) Date of Patent: Jul. 29, 2025

(54) METHOD FOR OPERATING A DRIVER ASSISTANCE SYSTEM OF A VEHICLE AND PROCESSING DEVICE FOR CONTROLLING A DRIVER ASSISTANCE SYSTEM

(71) Applicant: Bayerische Motoren Werke Aktiengesellschaft, Munich (DE)

(72) Inventors: Dirk De Bruin, Allershausen (DE); Sebastian Gruenwedel, Ulm (DE); Christine Kock, Friesing (DE); Pascal Minnerup, Unterschleissheim (DE); Daniel Niehues, Unterschleissheim (DE); Sebastian Rauch, Eisenhofen (DE); Markus Schurius, Munich (DE); Bernd Spanfelner, Ebersberg (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 225 days.

(21) Appl. No.: 18/015,984

(22) PCT Filed: Jun. 29, 2021

(86) PCT No.: PCT/EP2021/067886
§ 371 (c)(1),
(2) Date: Jan. 13, 2023

(87) PCT Pub. No.: WO2022/012924
PCT Pub. Date: Jan. 20, 2022

(65) Prior Publication Data
US 2023/0271608 A1   Aug. 31, 2023

(30) Foreign Application Priority Data
Jul. 15, 2020 (DE) ............... 10 2020 118 630.4

(51) Int. Cl.
*B60W 30/12* (2020.01)
*B60W 30/095* (2012.01)
(Continued)

(52) U.S. Cl.
CPC ........ *B60W 30/12* (2013.01); *B60W 30/0956* (2013.01); *B60W 30/18163* (2013.01);
(Continued)

(58) Field of Classification Search
CPC ............. B60W 30/0956; B60W 30/12; B60W 30/18163; B60W 40/06; B60W 50/14;
(Continued)

(56) References Cited

U.S. PATENT DOCUMENTS

2010/0104199 A1   4/2010   Zhang et al.
2014/0067187 A1   3/2014   Ferguson et al.
(Continued)

FOREIGN PATENT DOCUMENTS

DE   10 2013 217 860 A1   3/2015
DE   10 2019 133 316 A1   6/2021
EP    3 636 507 A1         4/2020

OTHER PUBLICATIONS

International Search Report (PCT/ISA/210) issued in PCT Application No. PCT/EP2021/067886 dated Oct. 22, 2021 with English translation (four (4) pages).
(Continued)

*Primary Examiner* — Erick R Solis
(74) *Attorney, Agent, or Firm* — Crowell & Moring LLP (57) ABSTRACT

A method for operating a driver assistance system of a vehicle includes the steps of: checking whether there is a motorway exit or roadworks on a first side of the vehicle; checking whether an environment sensor system of the vehicle detects a lane marking that bounds a lane of the vehicle on a second side, which is opposite the first side; if
(Continued)

the result of the checking is that there is a motorway exit or roadworks on the first side of the vehicle and that the environment sensor system detects the lane marking, operating a lane-keeping function of the driver assistance system; and if the result of the checking is that there is a motorway exit or roadworks on the first side of the vehicle and that the environment sensor system does not detect the lane marking, triggering a takeover request to a driver of the vehicle.

10 Claims, 3 Drawing Sheets

(51) Int. Cl.
| | | |
|---|---|---|
| | *B60W 30/18* | (2012.01) |
| | *B60W 40/02* | (2006.01) |
| | *B60W 40/06* | (2012.01) |
| | *B60W 50/14* | (2020.01) |
| | *B60W 60/00* | (2020.01) |

(52) U.S. Cl.
CPC ............ *B60W 40/02* (2013.01); *B60W 40/06* (2013.01); *B60W 50/14* (2013.01); *B60W 60/00184* (2020.02); *B60W 2420/00* (2013.01); *B60W 2552/53* (2020.02)

(58) Field of Classification Search
CPC ........... B60W 50/16; B60W 2050/143; B60W 2050/146; B60W 60/00184; B60W 60/0024; B60W 60/0053; B60W 60/0059; B60W 2552/53
USPC .............................................. 701/41, 43, 44
See application file for complete search history.

(56) References Cited

U.S. PATENT DOCUMENTS

| | | | |
|---|---|---|---|
| 2016/0046290 A1 | 2/2016 | Aharony et al. | |
| 2016/0203375 A1 | 7/2016 | Nitschke et al. | |
| 2019/0071091 A1* | 3/2019 | Zhu | G08G 1/166 |
| 2020/0282998 A1* | 9/2020 | Yashiro | B60W 50/14 |
| 2020/0327812 A1* | 10/2020 | Ran | G08G 1/096783 |
| 2022/0176955 A1* | 6/2022 | Choi | G06V 20/584 |
| 2022/0281456 A1* | 9/2022 | Giovanardi | B60W 30/18163 |
| 2022/0289228 A1* | 9/2022 | Yamamoto | B60K 35/28 |

OTHER PUBLICATIONS

German-language Written Opinion (PCT/ISA/237) issued in PCT Application No. PCT/EP2021/067886 dated Oct. 22, 2021 (seven (7) pages).

German-language Search Report issued in German Application No. 10 2020 118 630.4 dated Mar. 23, 2021 with partial translation (11 pages).

* cited by examiner

METHOD FOR OPERATING A DRIVER ASSISTANCE SYSTEM OF A VEHICLE AND PROCESSING DEVICE FOR CONTROLLING A DRIVER ASSISTANCE SYSTEM

BACKGROUND AND SUMMARY

The invention relates to a method for operating a driver assistance system of a vehicle and to a processing device for controlling a driver assistance system.

In particular, the invention relates to protection against potential errors in the form of an unintentional departure from an intended lane, or from an operational design domain for which the driver assistance system is intended, such as e.g. a motorway. In this regard, reference may be made to German patent application 10 2019 133 316.4, which describes a concept, the object of which, inter alia, is the reliable confirmation, by means of location and sensor-based validation, that a vehicle is not in the lane in which it is intended to be driven. The content of German patent application 10 2019 133 316.4 is expressly incorporated herein.

The invention further relates to a computer program for executing such a method, and to a computer-readable (storage) medium, which comprises commands for the execution of such a method.

A vehicle can comprise a driver assistance system which is designed to influence longitudinal and lateral steering of the vehicle. For example, a lane assist system can be designed to maintain the vehicle between lane markings. Markings can be scanned and automatically detected, e.g. by means of a camera.

Many driver assistance systems require the detection of an exact position of the vehicle. This position can be defined in a longitudinal and/or lateral direction, and expressed with reference to a predefined reference point. An absolute geographical position can be determined, for example, by reference to a predefined geodetic reference system, such as WGS84. A relative position of the vehicle can be indicated, for example, in a transverse direction, in relation to a lane marking detected.

Determination of the position of a vehicle is customarily susceptible to a series of potential errors and inaccuracies. For example, sensors can deliver noisy and/or corrupted information, or can occasionally fail altogether. Different conditions of measurement or complex processing heuristics result in determinations of differing accuracy or reliability. If the vehicle is controlled on the basis of an incorrectly determined position, the safety of the vehicle or of an occupant can be compromised.

A conceivable critical error can occur, wherein an automated vehicle which has been designed and validated for automated operation only in specifically determined operational design domains such as, for example, motorways, inadvertently departs from said operational design domains, e.g. by turning off a motorway.

In normal operation, this is prevented by the vehicle, wherein the latter automatically follows the lane which continues along the motorway. However, it can nevertheless occur, for example on the grounds of a camera lane detection anomaly, that a vehicle follows an incorrect lane marking, which leads to a motorway exit. As a result, the vehicle can enter a region in which an automated driving mode can no longer be safely and reliably pursued, e.g. in an urban environment, in which there is a high probability of the presence of vulnerable road users (VRUs) in the lane, or in which unexpected cross-traffic can occur. This incorrect lane marking can be for example, a lane marking which is actually present, indicating a transition to an exit lane. At a motorway exit, the interrupted ("broken") line, which indicates the regular right-hand lane in the region of the exit, customarily commences somewhat later, whereas the solid line executes a transition to the exit; thus, if the automated vehicle adheres strictly to the solid line, it will be guided directly into the exit. Alternatively, the incorrect lane marking can be a marking which is not present, or a "ghost marking", e.g. in the form of an anomaly in the asphalt surface which resembles a carriageway marking, or a non-permanent and diversionary lane marking, which is a remnant of previous roadworks.

Challenges of this type can occur, in principle, not only at motorway exits, but also, for example, at motorway junctions or in the region of roadworks. In the context of the present application, accordingly, the term "motorway exit" also includes motorway junctions.

A fundamental object of the invention is the provision of a method for operating a driver assistance system which at least partially overcomes the above-mentioned disadvantages of driver assistance systems which are known from the prior art. The invention fulfils this object by means of the subject matter of the independent claims. Preferred embodiments are described in the subclaims.

It should be observed that additional features of a dependent patent claim which is dependent upon an independent patent claim, in the absence of the features of said independent patent claim or in combination with only a proportion of the features of the independent patent claim, can constitute a standalone invention which is independent of the combination of all the features of the independent patent claim, and which can be the subject of an independent claim, a divisional application or a subsequent application. The same applies, in a corresponding manner, to the technical instruction described in the description, which can constitute an invention which is independent of the features of the independent patent claims.

A first aspect of the present invention relates to a method for operating a driver assistance system of a vehicle.

One step of the method is the execution of a check as to whether a motorway exit or roadworks are located on a first (e.g. right-hand) side of the vehicle.

In the present context, by an indication to the effect that a motorway exit or roadworks are located on the first side of the vehicle, it can also be signified that the motorway exit or roadworks are still some distance in advance of the vehicle, in the direction of travel on the right-hand side, such that the vehicle will reach the motorway exit or roadworks within a foreseeable time.

In the region of a motorway exit or roadworks, according to experience, an additional lane can open, which the vehicle is not intended to take. The following process steps are particularly intended to protect the vehicle against the pursuit of any such actual or putatively present turn-off lane. In principle, a method of the type described herein is also applicable outside the context of motorway exits (or motorway junctions) and roadworks—namely, in any situation in which it can typically be anticipated that an actual or putatively present alternative or additional lane will open, which the vehicle is not intended to follow.

For example, checking as to whether a motorway exit or roadworks are present on a first side of the vehicle can be executed by reference to digital mapping information and/or by reference to information which is delivered by an environment sensor system of the vehicle.

The above-mentioned digital mapping information can be provided e.g. in the form of a digital map from a digital map store, which can be present in the vehicle. Alternatively, the digital map can also be communicated from the exterior of the vehicle, for example by the communication thereof to the vehicle from a server, wherein said communication is preferably executed via a wireless communication interface.

The digital map, for example, can be at least partially based upon data detected by sensors, and which are logged during one or more reconnaissance trips executed by a reconnaissance vehicle. An environment sensor system employed for this purpose can comprise, for example, a receiver of a global satellite navigation system (e.g. GPS or DGPS), one or more optical cameras, one or more RADAR sensors, and/or one of more LiDAR sensors.

Correspondingly, the digital map can comprise multiple layers wherein, for example, one layer is based upon data from a global satellite navigation system, a further layer is based upon optical camera data, and a further layer is based upon LiDAR data. The various layers can contain features which can be detected by means of the respective sensor system.

For example, the digital map can include explicit information with respect to the existence and position of exits and/or roadworks. Alternatively or additionally, information with respect to the existence and position of exits and/or roadworks can also be implicitly included in digital mapping information. Thus, for example, a characteristic road profile can be plotted in a digital map, wherein the road is initially broader and then narrows abruptly, which can be an indicator of the high probability of the presence of a motorway exit. Additionally, for example, an exit lane can be plotted in the map, without necessarily being explicitly identified as such.

The environment sensor system of the vehicle is generally designed to detect and deliver information with respect to the vehicle environment. The environment sensor system can particularly comprise a camera, a depth-sensing camera, a RADAR sensor, a LiDAR sensor or a similar sensor. A sensor of this type preferably operates in a contactless manner, for example by the detection of electromagnetic waves or ultrasound waves, and can be image-generating. The environment sensor system preferably comprises a plurality of diverse and/or statistically independent sensors such as e.g. one or more LiDAR sensors and/or one or more RADAR sensors and/or one or more optical cameras.

By means of the environment sensor system, indications of a motorway exit or roadworks can also be detected. Thus, for example, any sensor-detected void in a noise barrier can be interpreted as an indication of the presence of an exit. Moreover, by means of the environment sensor system, a road profile which is characteristic of an exit can also be identified.

In compliance with the above, according to an optional further development, the check as to whether a motorway exit or roadworks are present on a first side of the vehicle is executed in consideration of a road profile which is represented in digital mapping information and/or in information which is delivered by the environment sensor system of the vehicle.

Alternatively or additionally, the check as to whether a motorway exit or roadworks are present on a first side of the vehicle can be executed in consideration of one or more traffic signs and/or in consideration of one or more lane markings, which are detected by means of the environment sensor system of the vehicle.

Relevant traffic signs can include, inter alia, explicit roadworks signs, exit signs (e.g. for the identification of the exit and the distance thereto), or distance marker signs which, inter alia, on German motorways, customarily indicate an approaching exit.

A relevant lane marking with respect to roadworks can be, for example, a short broken and/or colored (e.g. yellow) line on the first side of the vehicle.

A further step of the method is a check as to whether the environment sensor system of the vehicle detects a lane marking (which is anticipated e.g. in accordance with digital mapping information) which delimits a lane of the vehicle on a second side (e.g. the left-hand side), which is opposite the first side. In particular, a check can be executed as to whether the lane marking on the second side is detected with sufficient security as a (currently) relevant, i.e. valid lane marking, which delimits the lane of the vehicle on the second side. The lane marking thus detected on the second side can be, for example, a regular (e.g. solid white or broken white) lane marking, or a temporary (e.g. yellow) lane marking, such as e.g. a roadworks marking.

If it proceeds from the check that a motorway exit or roadworks are present on the first side of the vehicle, and that the environment sensor system detects a lane marking (which is anticipated e.g. in accordance with digital mapping information) on the second side, in a further step of the method, a lane-keeping function of the driver assistance system is operated or maintained in service. The lane-keeping function is preferably guided by the lane marking detected on the second side, and not (or, in any event, not exclusively) by any additionally detected lane marking which delimits the lane on the first side.

If, conversely, it proceeds from the check that a motorway exit or roadworks are present on the first side of the vehicle, and that the environment sensor system does not detect a lane marking, according to a further step of the method, a take-over request (TOR) is generated for the attention of a driver of the vehicle. This signifies that, in a manner which is perceptible to the driver (i.e., for example, acoustically and/or optically), an indication is issued to the driver to the effect that they must now assume the at least partially manual control of the vehicle, in preparation for a safe deactivation of the driver assistance system, or at least of a driver assistance function of the driver assistance system which, according to a preferred embodiment, can then be executed automatically in a further step.

The invention incorporates the finding to the effect that, in order to prevent any unintentional departure of an automated vehicle from its intended lane in the vicinity of a motorway exit or roadworks, it is appropriate to execute a check as to whether a lane demarcation on the opposing side to the motorway exit or roadworks is reliably detected. Thus, for example, in the region of an exit on a German motorway, it is important to detect the left-hand lane demarcation (and to be oriented with respect thereto), as one of the right-hand lane demarcations forms part of the exit itself, and leads into the latter. According to the invention, it is therefore provided that, as a precondition for a TOR, two conditions must be fulfilled: firstly, an indication of an exit or roadworks must be present and, secondly, the absence of the detection of a (second) lane demarcation on the opposing side to the motorway exit or roadworks is required.

Preferably, in the check as to whether a relevant (e.g. left-hand) lane demarcation is thus detected, digital mapping information can be combined and mutually compared with environment sensor information such as e.g. camera data. If the vehicle is traveling, e.g. in the vicinity of a motorway exit, a check is executed as to whether the left-hand lane demarcation can be confirmed by both the camera and the map. If this is not the case, a take-over request (TOR) is initiated, in order to preclude any unintentional departure from the motorway. In an embodiment of this type, the vehicle can undertake the comparison of lane markings in critical regions with expectations, in a targeted manner, in accordance with the available map.

Provided that no exit or roadworks are present in the vicinity, conversely, it can be sufficient according to the invention that only the left- or right-hand lane demarcation can be confirmed. In a region with no exit or roadworks, confirmation of only one lane demarcation can provide an adequate measure of safety integrity. Accordingly, for example, it should preferably not be required as a matter of principle (i.e. even outside areas featuring a motorway exit(s) or roadworks) that the left-hand lane demarcation is identified at all times, or a TOR will otherwise be posted. In practice, on the grounds of inevitable and sporadic camera detection errors alone, this would result in excessively frequent TORs, which would render the use of the driver assistance function inconvenient for the user. Instead, it is preferred that detection is specifically required, in a targeted manner, for the left-hand (generally the second) lane demarcation, in regions featuring motorway exit(s) or roadworks, and that, outside such regions, in the interests of the prevention of a TOR, for example, it is sufficient that at least one (left- or right-hand) lane demarcation is detected. This reduced requirement advantageously results in only a limited number of TORs, as a result of which the overall availability of the automated driving function is improved.

The proposed method, according to a number of exemplary embodiments, therefore results in both a reduced number of TORs and in the extremely rare occurrence of unintentional departures from a motorway, or extremely rare departures from the intended lane. Accordingly, for example, preconditions for a TOR can be either an error in the map, or the absence of any camera in the vehicle camera system which is in a position to detect the left-hand lane. At the same time, it is necessary for a motorway exit or roadworks to be present in the vicinity of the vehicle. If any unintentional departure from a motorway were to occur, this would require e.g. the incorrect detection of a ghost lane marking by the camera which, moreover, is incorrectly included in the map, thereby resulting in a departure from the motorway. This is highly improbable, unless this lane marking existed previously, and has subsequently been replaced by a new lane marking.

According to one variant of embodiment, the method comprises the following steps: checking as to whether an environment sensor system of the vehicle detects a lane marking which delimits a lane of the vehicle on the first (e.g. the right-hand) side; if it proceeds from the check that roadworks are located on the first side of the vehicle, and that the environment sensor system detects lane markings (e.g. which are anticipated in accordance with digital mapping information) which delimit the lane on the first side and the second side, execution of the (further) operation of a lane-keeping function of the driver assistance system (wherein the driver assistance system preferably executes orientation vis-à-vis the lane marking on the second side, and not vis-à-vis a lane marking on the first side); and, if it proceeds from the check that roadworks are located on the first side of the vehicle, and that the environment sensor system does not detect the lane marking which delimits the lane on the first side or the lane marking which delimits the lane on the second side, triggering of a take-over request for the attention of a driver of the vehicle. Thus, in other words, according to this variant of embodiment, in the event that roadworks are detected, it is required that both lane markings are detected, or a TOR will otherwise be triggered. As a result, safety in the vicinity of roadworks, particularly with respect to the prevention of any departure from an intended lane, is further enhanced.

According to a second aspect of the invention, a processing device is proposed for controlling a driver assistance system, wherein the processing device is designed to execute the following steps: checking as to whether a motorway exit or roadworks are located on a first side of the vehicle; checking as to whether an environment sensor system of the vehicle detects a lane marking which delimits a lane of the vehicle on a second side, which is opposite the first side; if it proceeds from the check that a motorway exit or roadworks are located on a first side of the vehicle, and that the environment sensor system detects the lane marking, generation of one or more commands for the operation of a lane-keeping function of the driver assistance system; and, if it proceeds from the check that a motorway exit or roadworks are located on the first side of the vehicle, and that the environment sensor system does not detect the lane marking, generation of one or more commands for the triggering of a take-over request for the attention of a driver of the vehicle.

In compliance with the above, the processing device can particularly be designed to execute a method according to the first aspect of the invention. Features or advantages of the method can be correspondingly transferred to the processing device, or vice versa.

For example, the processing device can comprise a programmable microcomputer or microcontroller, and the method can be provided in the form of a computer program product with program code means. The computer program product can also be saved on a computer-readable data medium.

The processing device can be, for example, an element of a control system of the vehicle, which comprises one or more processors (such as e.g. CPUs and/or GPUs), on which the requisite computing operations for the implementation of the method are executed.

For example, the vehicle, the driver assistance system of which is to be operated, can comprise a processing device according to the second aspect.

The vehicle preferably comprises a drive motor, and is a motor vehicle, particularly a road-based motor vehicle. The motor vehicle can be controlled in a longitudinal direction, for example by influencing the drive motor or a braking device.

The vehicle is preferably designed for at least partially automated driving, ranging up to highly-automated driving or even self-driving. For example, in the context of a driver assistance system, a driving function can particularly execute an automated longitudinal and/or lateral control of the vehicle, for example in the form of a speed assistance function or a lane-keeping assistance function.

A third aspect relates to a computer program, comprising commands which, upon the execution of the computer program by a processing device (such as e.g. a processing device according to the second aspect of the invention), initiate the execution by the latter of the following steps: checking as to whether a motorway exit or roadworks are located on a first side of the vehicle; checking as to whether an environment sensor system of the vehicle detects a lane marking which delimits a lane of the vehicle on a second side, which is opposite the first side; if it proceeds from the check that a motorway exit or roadworks are located on a first side of the vehicle, and that the environment sensor system detects the lane marking, generation of one or more commands for the operation of a lane-keeping function of the driver assistance system; and, if it proceeds from the check that a motorway exit or roadworks are located on the first side of the vehicle, and that the environment sensor system does not detect the lane marking, generation of one or more commands for the triggering of a take-over request for the attention of a driver of the vehicle.

A fourth aspect of the invention relates to a computer-readable (storage) medium, comprising commands which, upon the execution thereof by a processing device (such as e.g. a processing device according to the second aspect of the invention), initiate the execution by the latter of the following steps: checking as to whether a motorway exit or roadworks are located on a first side of the vehicle; checking as to whether an environment sensor system of the vehicle detects a lane marking which delimits a lane of the vehicle on a second side, which is opposite the first side; if it proceeds from the check that a motorway exit or roadworks are located on a first side of the vehicle, and that the environment sensor system detects the lane marking, generation of one or more commands for the operation of a lane-keeping function of the driver assistance system; and, if it proceeds from the check that a motorway exit or roadworks are located on the first side of the vehicle, and that the environment sensor system does not detect the lane marking, generation of one or more commands for the triggering of a take-over request for the attention of a driver of the vehicle.

The preceding and following embodiments of the method according to the first aspect of the invention can apply in a corresponding to the processing device according to the second aspect of the invention, and to the computer program and the computer-readable (storage) medium according to the third or fourth aspect of the invention. Advantageous exemplary embodiments of the processing device according to the invention, the computer program according to the invention and/or the computer-readable (storage) medium which are not explicitly described at this point, and in the patent claims, correspond to advantageous embodiments of the method according to the invention described in the description or in the patent claims, and vice versa.

The invention is described in greater detail hereinafter with respect to exemplary embodiments, and with reference to the attached drawings. Features and combinations of features which are specified individually in the description and/or represented individually in the drawings are not only applicable in the respective combination indicated, but also in other combinations or in isolation, without departing from the scope of the invention.

DETAILED DESCRIPTION OF THE DRAWINGS

Figure 1:
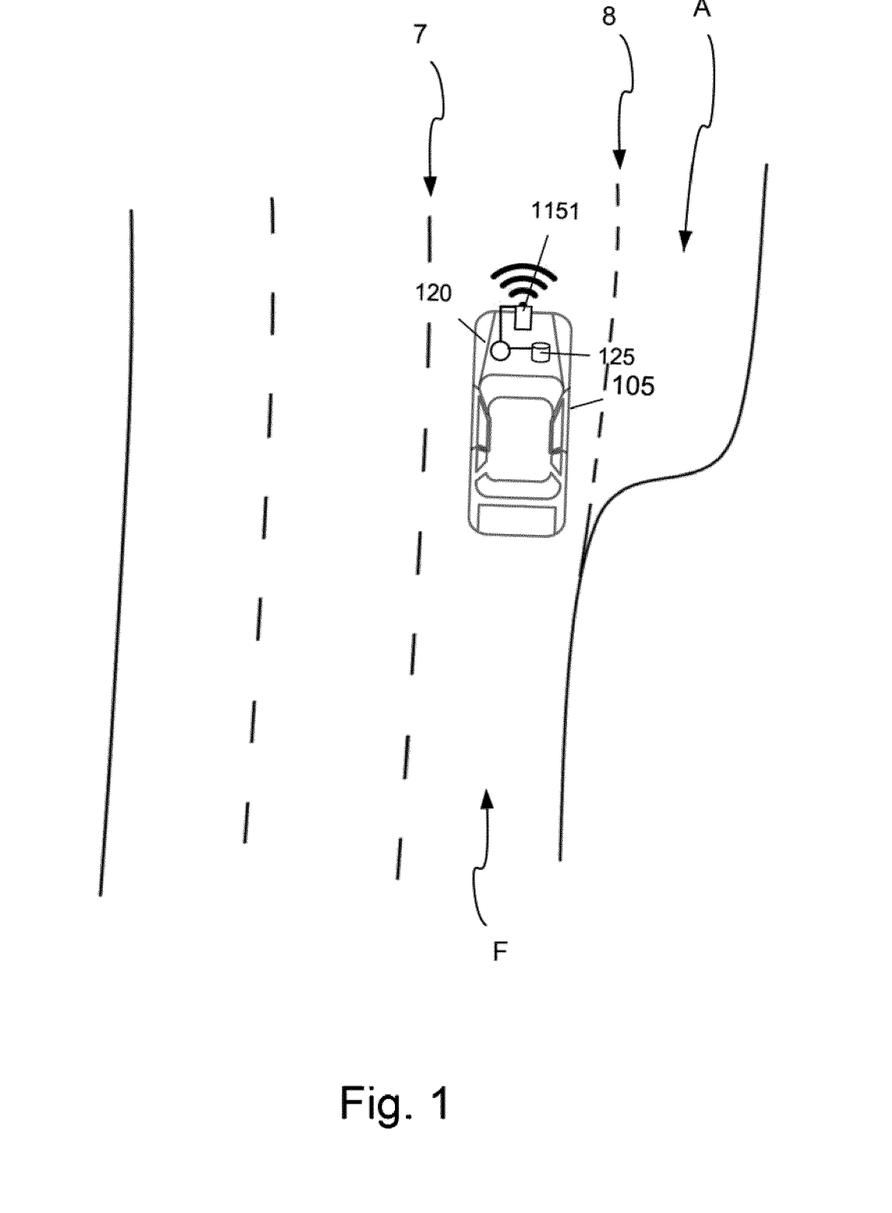
FIG. 1 is a schematic representation of an exemplary situation involving a motorway exit, in which a method according to an embodiment of the invention can be employed.
Figure 2:
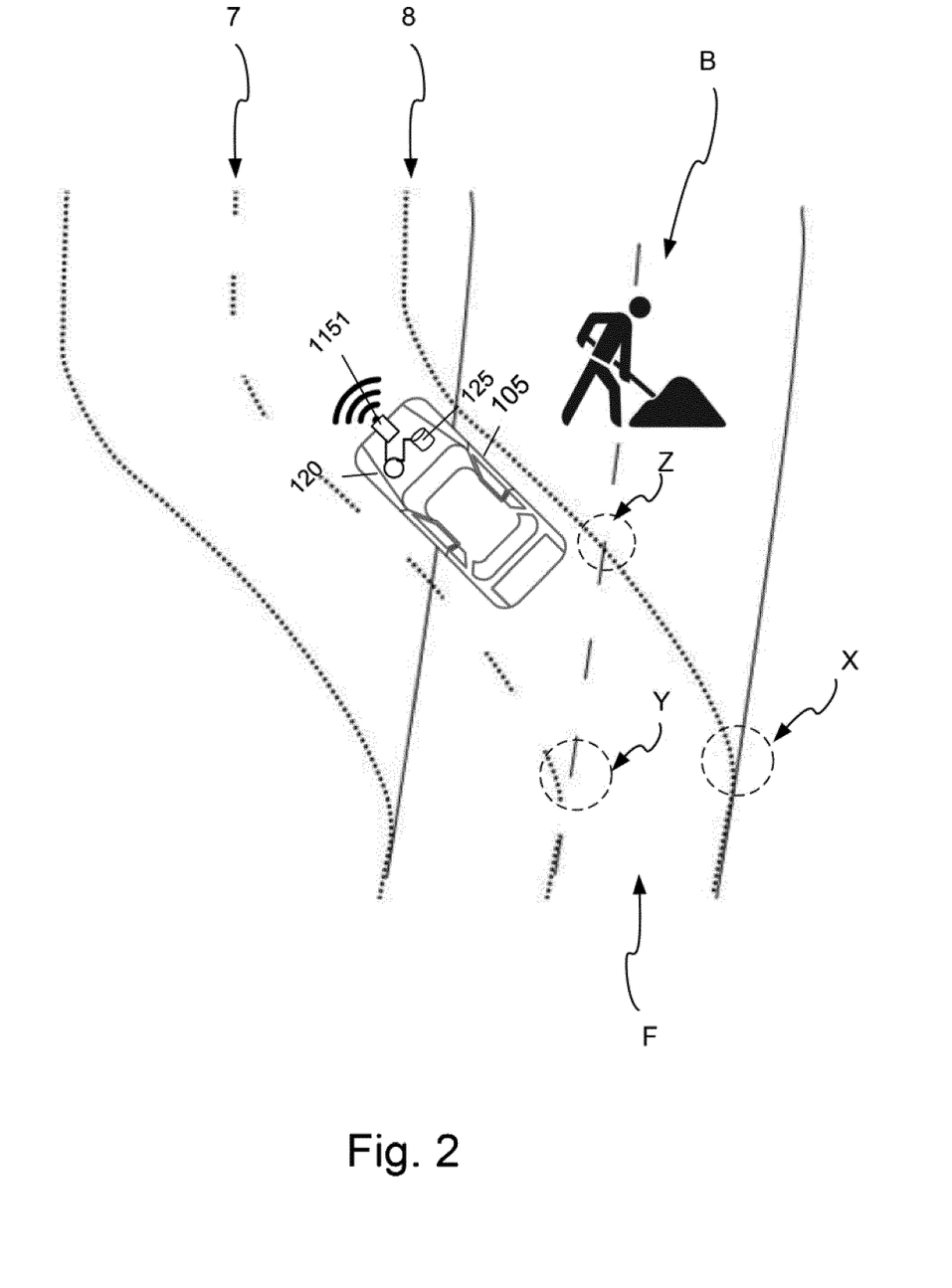
FIG. 2 is a schematic representation of an exemplary situation involving motorway roadworks, in which a method according to an embodiment of the invention can be employed.

FIGS. 1 and 2 relate to a respective exemplary scenario, in which a method 200 for operating a driver assistance system of a vehicle 105 can be employed. The invention is described in an exemplary manner hereinafter with reference to these exemplary scenarios, wherein reference is also made to FIG. 3, which shows a schematic flow diagram of the method 200.

The vehicle 105 represented is designed for automated driving, at least to the extent that it comprises a driver assistance system having a lane-keeping function. To this end, it must be capable of determining its position, particularly in relation to lane demarcations and, optionally, in relation to objects in the vehicle environment. A driving function of the vehicle 105 can then be controlled automatically, in accordance with the position thus determined. The driving function can execute an automatic longitudinal and/or lateral control of the vehicle 105.

The vehicle 105 is equipped with an environment sensor system wherein, in FIGS. 1 and 2, for exemplary purposes, only one environment sensor in the form of a LiDAR sensor 1151 is represented in each case. Moreover, the environment sensor system of the vehicle 105 can preferably comprise, for example, one or more cameras and, optionally, one or more RADAR sensors. Additionally, a receiver device for a global satellite navigation system, which is not explicitly represented in the figures, and/or an odometer for the delivery of odometry data can be provided.

A processing device 120 is additionally arranged in the vehicle 105. The processing device 120 can be e.g. an element of a control system for the automated driving function of the vehicle 105. The processing device 120 comprises one or more processors (such as e.g. CPUs and/or GPUs), on which the requisite computing operations for the implementation of a method 200 for operating the driver assistance system are executed.

Figure 3:
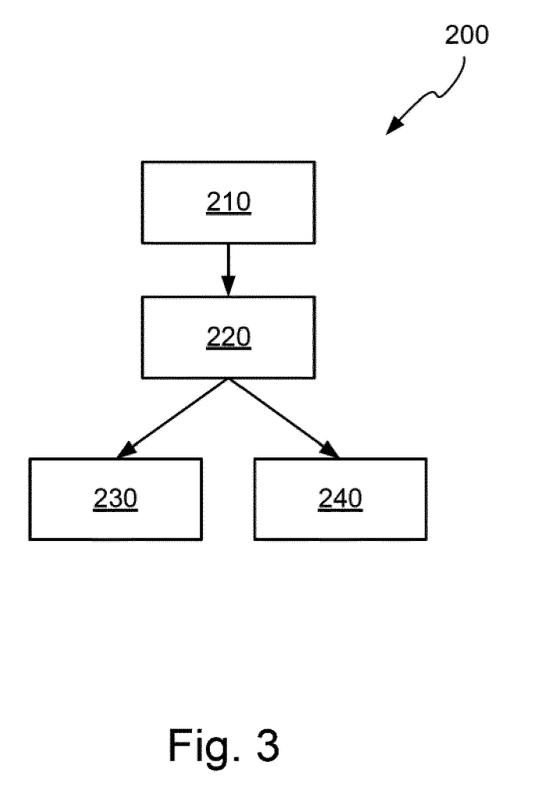
FIG. 3 is a schematic flow diagram of a method according to an embodiment of the invention for operating a driver assistance system.

Steps of the method 200 are illustrated schematically in FIG. 3. The individual process steps 210-240 from FIG. 3 are described hereinafter, in an exemplary manner, with reference to FIGS. 1 and 2.

In the situation represented in FIG. 1, the vehicle 105 is traveling in the outside right-hand lane F of a three-lane motorway. In a planned manner, the driver assistance system is intended to maintain the vehicle 105 on the motorway. Accordingly, it is not intended that the vehicle 105 should leave the motorway.

In the exemplary situation represented in FIG. 2, the vehicle 105 is traveling in the right-hand lane F of a two-lane motorway, which it is not intended to leave.

In both situations, in a step 210, a check is firstly executed as to whether a motorway exit A or roadworks B are located on a first side of the vehicle 105.

This check can be executed e.g. by reference to digital mapping information and/or by reference to information which is delivered by the environment sensor system 1151. For example, the processing device 120 or a software module which is executed by the processing device 120 can receive a digital map with corresponding information which indicates the presence of a motorway exit A or roadworks B. In the present exemplary embodiment, a digital map of this type is provided by a digital map store 125 which is arranged in the vehicle 105 and is communicatively connected to the processing device 120.

In the example according to FIG. 1, it proceeds from the check that a motorway exit A is opening on the right-hand side of the vehicle 105. This can be detected by the processing device 120 e.g. by reference to explicit information contained in the digital map, by reference to a road profile which is characteristic of a motorway exit and/or by reference to an information sign which is detected by means of the environment sensor system 1151. For example, detection of the lane marking 8 in the form of a short broken line on the right-hand side of the vehicle 105, which typically separates an exit lane from the right-hand lane F, can also assume a role.

In the example according to FIG. 2, it proceeds from the check that roadworks B are located on the right-hand side of the vehicle 105, wherein these can be detected by the processing device 120, for example by reference to digital mapping information and/or by reference to a roadworks sign which is detected by means of the environment sensor system 1151 or by reference to one or more roadworks distance marker signs.

In a further step 220, a check is then executed as to whether the environment sensor system 1151 detects a lane marking 7 with sufficient security, which delimits the lane F of the vehicle 105 on a second side, which is opposite the first side.

This check can comprise e.g. a comparison of environment sensor data with digital mapping information. In other words, for example, a check can be executed as to whether the environment sensor system 1151 detects a lane marking 7 on the second (in this case, the left-hand) side of the vehicle 105, which is anticipated in accordance with available digital mapping information.

For example, in the example according to FIG. 1, it can proceed from the checking step 220 that the environment sensor system 1151 reliably detects the lane marking 7 which delimits the outermost right-hand lane F of the three main lanes on the left-hand side, such that the driver assistance system can be oriented with respect thereto. Alternatively, however, the check can also generate a negative result, e.g. in case of a camera error, or in the event that the lane marking 7 has faded, or cannot currently be effectively detected by the environment sensor system 1151 on the grounds of unfavorable conditions of visibility.

With reference to the example according to FIG. 2, it can proceed from the checking step 220 that the environment sensor system 1151 detects the roadworks lane marking 7, which deviates from the original lane marking, and which delimits the right-hand roadworks lane F on the left-hand side, as the currently valid left-hand lane marking—or otherwise.

The diversion lane, which passes the roadworks B on the left-hand side, thus forming a diversion, is illustrated in FIG. 2 for representational purposes by dotted lines 7, 8. In reality, these lines can be, for example, yellow roadworks lane markings 7, 8, whereas the original lane markings can be white, as is customary inter alia on German motorways.

If it proceeds from the checking steps 210, 220 that a motorway exit A or roadworks B are located on the right-hand side of the vehicle 105, and that the environment sensor system 1151 detects the respectively valid lane marking 7, which delimits the lane F on the left-hand side, a lane-keeping function of the driver assistance system is operated in a further step 230, or the operation thereof is maintained (if said function has previously been in service).

The lane-keeping function is preferably oriented vis-à-vis the lane marking 7 which is detected on the left-hand side and not (or in any event not exclusively) vis-à-vis any additionally detected lane marking 8, which delimits the lane F on the right-hand side. With reference to the example according to FIG. 1, in practice, orientation vis-à-vis the left-hand lane marking 7 is generally classified as more reliable than orientation vis-à-vis the right-hand lane marking 8 on the grounds that, in the latter case, if the transition from the initially solid right-hand lane line 8 to the region of short broken lines is not correctly detected by the environment sensor system 1151, further pursuit of the solid lane marking line on the right-hand side would lead directly into the exit A.

With reference to the roadworks situation represented in FIG. 2, orientation vis-à-vis the initially solid right-hand lane line 8 would also pose the risk that the junction in the region marked in FIG. 2 by "X" would not be detected, as a result of which the vehicle 105 would continue to follow the original right-hand lane line, and might be directed straight into the roadworks B. Conversely, if the lane-keeping function is oriented vis-à-vis the left-hand lane line, the risk also applies, in principle, that the junction in the region marked by "Y" might be passed, such that the vehicle 105 might initially continue to follow the original broken line; however, this error might be detected and corrected at a further junction, which is marked in FIG. 2 by "Z".

Conversely, if it proceeds from the checking steps 210, 220 that a motorway exit A or roadworks B are located on the right-hand side of the vehicle 105, and that the environment sensor system 1151 does not detect the respectively valid lane marking 7 which delimits the lane F on the left-hand side, a take-over request (TOR) is generated for the attention of the driver of the vehicle 105 in step 240. For example, an acoustic and/or optical indication can be generated, to the effect that the driver must now assume the at least partial manual control of the vehicle 105. By means of such a TOR, preparation can be made for a safe deactivation of the driver assistance system, or at least of a driver assistance function of the driver assistance system.

According to a preferred embodiment, such automatic deactivation of the driver assistance system, or of a driver assistance function of the driver assistance system, is then executed in a further step.

In the event of the detection of roadworks, as in the example represented in FIG. 2, according to an advantageous variant of the embodiment, it can be provided that an additional check is executed as to whether the environment sensor system 1151 also detects the valid (roadworks) lane marking 8 which delimits the (diversion) lane F on the first side, i.e. on the right-hand side, on which the roadworks B are located.

If it proceeds overall from the above-mentioned checking steps 210, 220, and from any additional checking step, that roadworks B are located on the first (right-hand) side of the vehicle 105, and that the environment sensor system 1151 detects both lane markings 7, 8 which delimit the lane F on the first (right-hand) side and on the second (left-hand) side, the lane-keeping function is operated (or continues to operate), as described above with reference to step 230.

Conversely, if it proceeds from the above-mentioned checking steps that roadworks B are located on the first side of the vehicle 105, and that the environment sensor system 1151 does not detect the lane marking 8 which delimits the lane F on the first (right-hand) side or the lane marking 7 which delimits the lane F on the second (left-hand) side, a TOR is triggered and, optionally, an at least partial deactivation of the driver assistance system is initiated, as described above with reference to step 240.

By means of these variants of embodiment, safety in the region of roadworks, particularly with respect to the prevention of any departure from an intentional (diversion) lane F, can be further enhanced.

The invention claimed is:

1. A method for operating a driver assistance system of a vehicle, comprising:

checking as to whether a motorway exit or roadworks are located on a first side of the vehicle;

checking as to whether an environment sensor system of the vehicle detects a first lane marking which delimits a lane of the vehicle on the first side or a second lane marking which delimits the lane of the vehicle on a second side, which is opposite the first side;

if a result of the checking is that there is a motorway exit or roadworks located on the first side of the vehicle and that the environment sensor system detects the first and the second lane markings, operating a lane-keeping function of the driver assistance system such that the lane-keeping function is guided by the second lane marking; and if the result of the checking is that there is a motorway exit or roadworks located on the first side of the vehicle and that the environment sensor system detects the first lane marking but does not detect the second lane marking, triggering a take-over request for attention of a driver of the vehicle.

2. The method according to claim 1, wherein
the checking as to whether a motorway exit or roadworks are located on a first side of the vehicle is executed by reference to digital mapping information and/or by reference to information which is delivered by the environment sensor system of the vehicle.

3. The method according to claim 2, wherein
the checking as to whether a motorway exit or roadworks are located on a first side of the vehicle is executed in consideration of a road profile which is represented in the digital mapping information and/or in the information which is delivered by the environment sensor system of the vehicle.

4. The method according to claim 2, wherein
the checking as to whether a motorway exit or roadworks are located on a first side of the vehicle is executed in consideration of one or more traffic signs which are detected by the environment sensor system of the vehicle.

5. The method according to claim 2, wherein
the checking as to whether a motorway exit or roadworks are located on a first side of the vehicle is executed in consideration of the second lane marking which is detected by the environment sensor system of the vehicle.

6. The method according to claim 1, wherein
the operating of the lane-keeping function of the driver assistance system is executed such that the lane-keeping function is oriented vis-à-vis the detected second lane marking which delimits the lane on the second side.

7. The method according to claim 1, further comprising:
checking as to whether the environment sensor system of the vehicle detects the first lane marking which delimits the lane of the vehicle on the first side;

if a result of the checking is that there is roadworks located on the first side of the vehicle and that the environment sensor system detects the first and the second lane markings which delimit the lane on the first side and the lane on the second side, operating the lane-keeping function of the driver assistance system; and if the result of the checking is that there is roadworks located on the first side of the vehicle and that the environment sensor system does not detect the first lane marking which delimits the lane on the first side or the second lane marking which delimits the lane on the second side, triggering a take-over request for attention of a driver of the vehicle.

8. The method according to claim 1, wherein if a result of the checking is that there is a motorway exit or roadworks located on the first side of the vehicle and that the environment sensor system detects the first and the second lane markings, the lane-keeping function is operated independently of the first lane marking.

9. A device for controlling a driver assistance system, comprising:
a processing device, wherein the processing device is configured to execute the steps of:
checking as to whether a motorway exit or roadworks are located on a first side of a vehicle;
checking as to whether an environment sensor system of the vehicle detects a first lane marking which delimits a lane of the vehicle on the first side or a second lane marking which delimits the lane of the vehicle on a second side, which is opposite the first side;
if a result of the checking is that there is a motorway exit or roadworks located on a first side of the vehicle and that the environment sensor system detects the first and the second lane markings, generating one or more commands for operating a lane-keeping function of the driver assistance system such that the lane-keeping function is guided by the second lane marking; and
if the result of the checking is that there is a motorway exit or roadworks located on the first side of the vehicle and that the environment sensor system detects the first lane marking but does not detect the second lane marking, generating one or more commands for triggering a take-over request for attention of a driver of the vehicle.

10. A computer product comprising a non-transitory computer-readable medium having stored thereon program code which, upon execution by a processing device, carries out the steps of:
checking as to whether a motorway exit or roadworks are located on a first side of a vehicle;
checking as to whether an environment sensor system of the vehicle detects a first lane marking which delimits a lane of the vehicle on the first side or a second lane marking which delimits the lane of the vehicle on a second side, which is opposite the first side;
if a result of the checking is that there is a motorway exit or roadworks located on a first side of the vehicle and that the environment sensor system detects the first and the second lane markings, generating one or more commands for operating a lane-keeping function of a driver assistance system such that the lane-keeping function is guided by the second lane marking; and
if the result of the checking is that there is a motorway exit or roadworks located on the first side of the vehicle and that the environment sensor system detects the first lane marking but does not detect the second lane marking, generating one or more commands for triggering a take-over request for attention of a driver of the vehicle.

* * * * *